March 14, 1961            L. S. TERP            2,974,944
TEMPERATURE RESPONSIVE SPRING RATE COMPENSATING DEVICE
Filed Dec. 4, 1957
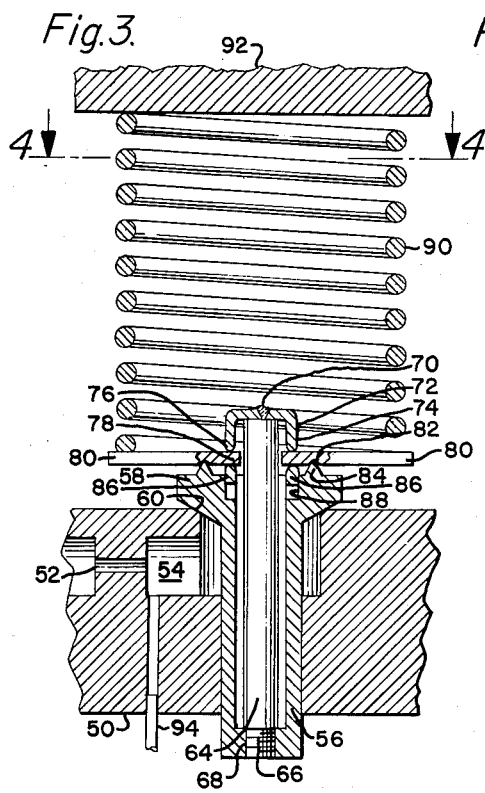
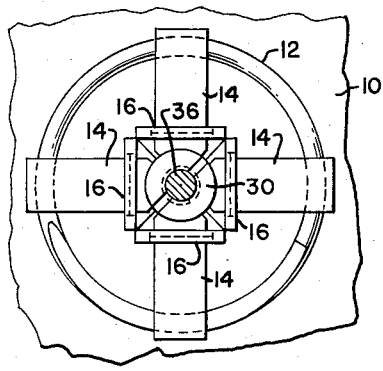
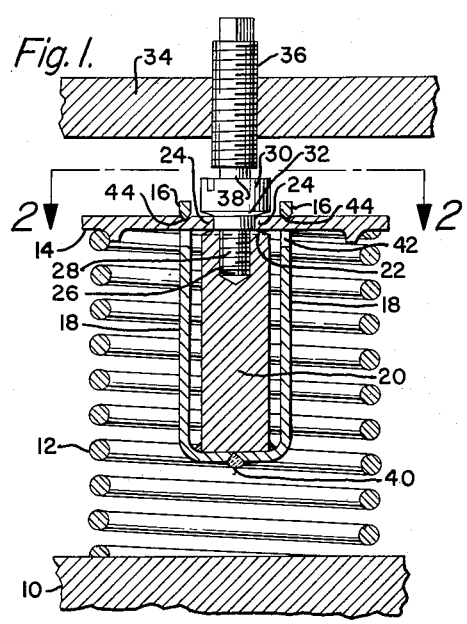
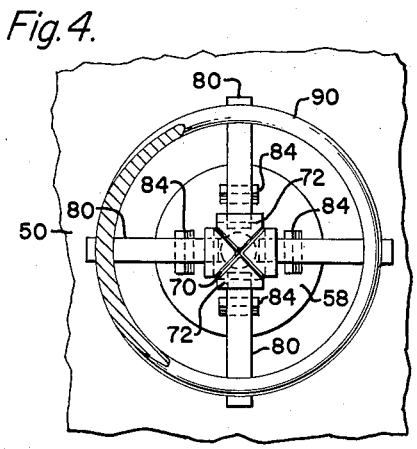
LESLIE S. TERP
INVENTOR.
BY
Attorney.

United States Patent Office 2,974,944
Patented Mar. 14, 1961

2,974,944

TEMPERATURE RESPONSIVE SPRING RATE COMPENSATING DEVICE

Leslie S. Terp, Scottsdale, Ariz.

Filed Dec. 4, 1957, Ser. No. 700,588

9 Claims. (Cl. 267—1)

This invention relates to a temperature responsive spring rate compensating device, and more particularly to such a device which may be operable in confined spaces like those within coil springs.

It is generally known that the rate of a spring usually decreases in response to an increase of temperature, and conversely, the rate increases in response to decreases of temperature. This characteristic of springs imposes a difficulty in maintaining an accurate calibration of any device which depends upon a spring to provide a reference force.

Temperature responsive spring rate compensating devices usually employ bulky temperature responsive members, some of which include a bimetallic element, wherein two parts having different coefficients of expansion are fused together. Other temperature responsive spring rate compensating devices are quite long or bulky in order to attain sufficient movement to compensate for changes in the rate of a respective spring in accordance with temperature variations.

Bimetallic structures tend to take a set when subjected to sustained loads under high temperature conditions. This fault of a bimetallic structure is caused by a well-known slippage or displacement of its temperature responsive parts relative to each other at their adjacent surfaces, which are usually fused together by an alloy having a shear strength substantially less than that of either part.

Accordingly, it is an object of the invention to provide a compact temperature responsive spring rate compensating device which is durable when operating under high temperature conditions.

Another object of the invention is to provide a temperature responsive spring rate compensating device which employs means for amplifying the relative temperature responsive action of two members having different coefficients of expansion, whereby the device may be installed internally of a coil spring, the rate of which is adjusted by said device in accordance with temperature variations.

Another object of the invention is to provide a novel motion amplifying mechanism which cooperates with a pair of short concentric tubular members having different coefficients of expansion, whereby said mechanism amplifies the differential thermal response of the tubular members.

A further object of the invention is to provide a temperature responsive spring rate compensating device which is very light and compact with relation to its function, whereby said device is particularly adaptable for use with aircraft accessories.

Further objects and advantages of the invention will be apparent from the following specification, appended claims, and accompanying drawings, in which:

Figure 1 is a fragmentary axial sectional view of a temperature responsive spring rate compensating device formed in accordance with the present invention;

Fig. 2 is a horizontal sectional view taken on the plane indicated by the line 2—2 of Fig. 1;

Fig. 3 is a fragmentary axial sectional view of a modified form of temperature responsive spring rate compensating device formed in accordance with the invention, showing a pressure regulator cooperable therewith; and Fig. 4 is a sectional view taken on the plane indicated by the line 4—4 of Fig. 3.

As shown in Fig. 1, an element 10 is engaged by a spring 12 which exerts a force thereon. The element 10 may be any device which requires an accurate reference force to be applied thereto. According to the present invention, it is desired to maintain the force of the spring 12 constant when subjected to a variety of ambient temperatures. Since the spring 12 has a tendency to relax slightly with increases of temperature, it is desirable to compensate for such relaxation, or loss of spring rate, by slightly compressing the spring in proportion to increases of temperature. Conversely, it is desired to reduce compressive force of the spring in accordance with reductions of ambient temperature which normally tend to slightly increase spring rate. While the spring 12 is engaged at its one end by the element 10, the opposite end of the spring 12 is engaged by a plurality of levers 14. These levers are pivotally engaged on one side by fulcrum elements 16 carried by arms 18, which are connected together in a basketlike assembly in surrounding relation with a thermostatic rod 20. This rod element has one end 22 in loose contacting engagement with the opposite sides of the levers 14 at the inner ends 24 thereof. The rod 20 has a higher coefficient of expansion than the arms 18; it is provided with an internally threaded bore 26 in the end engaged with the levers 14, and a screw 28 is disposed therein. The screw 28 is provided with an enlarged head 30 having a shoulder 32 which is disposed in spaced relation to the end 22 of the rod 20, whereby the ends 24 of the levers 14 are arranged for pivotal movement between the end 22 of the rod 20 and the shoulder 32 of the screw head 30. The levers are maintained in their positions by lugs formed on the undersides of the levers adjacent the outer ends thereof, the lugs projecting into the interior of the spring and engaging the inner sides of the top convolution. Adjustably threaded in a stationary support 34 is a screw 36 having one end 38 bearing upon the head 30 of the screw 28, whereby initial calibration or loading of the spring 12 may be accomplished. With the screw 28 supported in stationary position, the adjacent end of the thermostatic rod 20 will also be held in a stationary position. Increases in temperature which normally tend to relax spring 12 cause expansion of the rod 20, whereby the end thereof remote from the screw 28 moves toward the element 10. Since the arms 18 do not expand as much as rod 20, the fulcrums 16 are moved in the same direction.

This movement of the fulcrums 16 swings the outer ends of the levers 14, downwardly as viewed in Fig. 1, toward the element 10, thereby increasing the compression of the spring 12. A reduction in ambient temperature has the opposite effect upon the thermostatic members 18 and 20 and the levers 14 are caused to move away from the element 10, thereby reducing the compression of the spring 12.

In the form of the invention illustrated in Fig. 1, the ratio of the levers 14 is approximately 4:1. This leverage ratio permits the use of short thermostatic members 18 and 20, the differential motion of which is amplified so that movement of the levers at the points of engagement with the spring 12 will be four times the amount of the differential movement between the arms 18 and rod 20. Since there are a plurality of levers of equal length and ratio the motion imparted to the spring will be the same at all points engaged by the levers.

In the construction of the device shown in Fig. 1 of the drawings, the arms 18 are fixed to one end of the rod 20 by a weld 40, which connects all of the arms 18 together in a basket-shaped assembly and fixes them concentrically around the rod 20. The levers 14 are inserted through slots 42 in the arms 18, and notches 44 in the levers 14 are engaged with conforming V-shaped portions on the arms, which provide the pivotal axes of the fulcrum elements 16. The screw 28 is threaded into place in the bore 26 of the rod 20, and the screw 36 may then be adjusted to bear upon the head 30 of the screw 28 and thereby apply compressive force to the spring 12 to impose a predetermined load thereon so that it may be calibrated to exert a desired force upon the element 10.

In operation, a constant force is accurately maintained and applied to the element 10 by the spring 12, since variations in temperature which normally affect the spring rate, or force of the spring, are automatically compensated for by responses of the arms 18 and rod 20 to temperature changes, as hereinbefore described.

In the modification shown in Fig. 3 of the drawings, the present invention is applied to and combined with a pressure relief valve which may serve as a bleedoff type pressure regulator. In this modified structure, an element of the pressure regulator seves as a temperature responsive element to provide differential movement which is imparted to the spring to vary the loading thereof in accordance with temperature changes.

As shown in Fig. 3 of the drawings, a pressure relief valve housing 50 is provided with a restricted pressure fluid inlet orifice 52 which delivers pressure fluid into an annular chamber 54 surrounding the hollow stem 56 of a pressure relief poppet valve 58, which cooperates with a valve seat 60 at one end of the annular chamber 54. A thermostatic rod 64 is positioned in the hollow stem 56 and is provided with an externally threaded end 66 which is connected with an internally threaded bore 68 formed in one end of the valve stem 56. Thus, one end of the rod 64 is fixed to the poppet valve stem 56. Fixed to the opposite end of the rod 64 by a weld 70 are arms 72. These arms 72 are disposed in a substantially rectangular basket-shaped assembly and are provided with portions 74 extending substantially parallel to the rod 72 and spaced outwardly therefrom. These portions 74 are provided with openings 76 through which the inner ends 78 of levers 80 project. The levers 80 have notch portions 82 which engage substantially knife-edged fulcrum bearings 84 extending from the head of the poppet valve 58. The ends 86 of the arms 72 are movably mounted in recesses 88 formed in the poppet valve 58.

A spring 90 engages the outer ends of the levers 80, and the opposite end of the spring is stationarily supported by a member 92. The spring 90 is preloaded between the member 92 and the levers 80 to exert a constant force upon the poppet valve 58 in opposition to fluid pressure in the annular chamber 54. This pressure tends to force the poppet valve 58 from the seat 60 and thereby vent pressure fluid downstream of the orifice 52. Thus, the poppet valve acts as a bleed-off pressure regulator to maintain a constant pressure in the annular chamber 54, whereby this pressure may be utliized as a control pressure and may be conducted to various devices via a conduit 94.

In order to compensate for the changes in the rate of the spring 90 due to temperature changes, the poppet valve stem 56 is made of a material having a higher coefficient of expansion than that of the material of the rod 64. An increase of temperature causes the stem 56 to increase in length to a greater extent than the rod 64. Since the position of the valve head 58 is determined by the fluid pressure in the chamber 54, the difference in elongation of the elements 56 and 64 causes the arm portions 74 to move the inner ends of the levers 80 toward the valve head 58. This movement rocks the levers about the knife-edge bearings 84, swinging the outer ends toward the member 92 and compressing the spring 90. The materials of the stem 56 and rod 64 selected, the lengths of these elements, and the lever ratio of the members 80 are so calculated that the spring 90 will be compressed the exact amount necessary to compensate for the relaxation thereof due to the increase in temperature. When the ambient temperature decreases, the difference in contraction of the stem 56 and rod 64 will have an opposite effect, the outer ends of the rod swinging downwardly to permit an expansion of spring 90 sufficient to compensate for the change in rate. The construction shown and described permits the thermostatically responsive members to be quite short in proportion to the adjusting movement of the levers 80 where they engage the spring 90.

From the foregoing, it will be understood that the spring 90 is acted upon by the levers 80 so that the effects of increasing temperatures are compensated for by increased compressive adjustment of the spring. Conversely, the levers are actuated in the opposite direction to relax compression of the spring when temperatures decrease.

It will be obvious to those skilled in the art that various modifications of the present invention may be resorted to in a manner limited only by a just interpretation of the following claims.

I claim:

1. In a temperature responsive spring rate compensating device, the combination of: first and second members formed of materials having different coefficients of expansion, one end of said first member being fixed to one end of said second member; lever means pivotally engaged by the opposite end of said first member; fulcrum means carried by the corresponding end of said second member, said fulcrum means having a pivotal engagement with said lever means and spring means engaged by said lever means on the opposite side of said fulcrum means from the engagement of said lever means and said first member; said lever means being provided to amplify relative movement of said members and transmit such movement to said spring.

2. In a temperature responsive spring rate compensating device, the combination of: first and second concentric members formed of materials having different coefficients of expansion, one end of said first member being fixed to one end of said second member; a plurality of levers engaged by the opposite end of said first member and extending radially therefrom; fulcrum means carried by the corresponding end of said second member and forming pivotal supports for said levers; and a spring engaged by said levers and surrounding said members, said levers having a ratio whereby a small differential movement between said first and second members imparts a relatively greater movement to the points on said levers in engagement with said spring.

3. In a temperature responsive spring rate compensating device, the combination of: inner and outer members formed of materials having different coefficients of expansion, said inner member being joined at the inner end to the adjacent end of said outer member; a plurality of lever elements disposed in radiating relation to said inner member and pivotally engaged therewith, said lever elements also being pivotally engaged with said outer member; and spring means engaged by the outer ends of said lever elements, said spring means being coaxially disposed relative to said members, relative axial movement between said members causing said lever elements to apply a varying force to said spring means.

4. In a temperature responsive spring rate compensating device, the combination of: a coil spring having one end formed for engagement with a member to which the force of the spring is to be applied; thermostatic means extending axially of said spring and having inner and outer members formed of materials with different coefficients of expansion, said members being joined at one end of the thermostatic means; and motion transmitting lever means engaged at one end with the opposite end of said spring, said lever means having a pivotal connection adjacent the other end with the free ends of the inner and outer members of said thermostatic means and serving to amplify the relative motion between said members due to temperature change and transmit the amplified motion to said spring.

5. In a temperature responsive spring rate compensating device, the combination of: a coil spring having one end formed for engagement with an abutment; thermostatic means disposed on the axis of said spring and having telescoped inner and outer members formed of materials with different coefficients of expansion, said members being joined at one end of the thermostatic means; and a plurality of levers engaged at one end with the opposite end of the spring, the other ends of the levers being pivotally engaged with the free end of one member of the thermostatic means, the free end of the second member of the thermostatic means pivotally engaging each of said levers at a point intermediate the ends thereof.

6. In a temperature responsive spring rate compensating device, the combination of: a coil spring having one end formed for engagement with an abutment; thermostatic means disposed on the axis of said spring and having telescoped inner and outer members formed of materials with different coefficients of expansion, said members being joined at one end of the thermostatic means; and a plurality of levers engaged at one end with the opposite end of the spring, the levers being pivotally engaged at the opposite ends with the free end of one member of the thermostatic means, the free end of the other member of the thermostatic means pivotally engaging said levers at a point adjacent the last-mentioned ends thereof.

7. In a temperature responsive spring rate compensating device, the combination of: a coil spring having one end formed for engagement with an abutment; thermostatic means disposed on the axis of said spring and having telescoped inner and outer members formed of materials with different coefficients of expansion, said members being joined at one end of the thermostatic means; and a plurality of levers engaged at one end with the opposite end of the spring, said levers having pivotal connections with the free ends of the inner and outer members of the thermostatic means to provide a motion amplifying means of predetermined ratio for transmitting relative motion of said members to said spring.

8. In a temperature responsive spring rate compensating device, the combination of: a coil spring having one end formed for engagement with an abutment; a first means resiliently urged toward a predetermined position by the free end of said spring, said means having a first member; a second member connected to said first member, said first and second members having different coefficients of expansion; and lever means pivotally supported on said first member and engaged at one side of the pivotal support with free end of said spring, said lever means being engaged at the other side of the pivotal support with said second member, relative movement of said first and second members serving to vary the rate of said spring without changing the position of said first means.

9. In a temperature responsive spring rate compensating device, the combination of: a coil spring having one end formed for engagement with an abutment; a first member having a predetermined coefficient of expansion; a second member having a coefficient of expansion different from that of said first member, said first and second members being connected to provide portions relatively movable in response to temperature changes; motion transmitting means pivotally engaged solely with said first and second members and the free end of said spring, said motion transmitting means serving to amplify the relative movement of said first and second members and apply such amplified movement to said spring to vary the rate thereof.

References Cited in the file of this patent

UNITED STATES PATENTS

| | | |
|---|---|---|
| 1,082,131 | Meacham | Dec. 23, 1913 |
| 1,369,815 | Johnson | Mar. 1, 1921 |
| 1,421,825 | Osgood | July 4, 1922 |
| 1,856,489 | Lonergan et al. | May 3, 1932 |
| 1,919,265 | Vaughn | July 25, 1933 |
| 2,570,432 | Dillon | Oct. 9, 1951 |